United States Patent [19]
Uno et al.

[11] 3,754,127
[45] Aug. 21, 1973

[54] EMERGENCY SUPERVISING EQUIPMENT

[75] Inventors: Tadakazu Uno, Tokyo; Toichi Kataoka, Urawa; Noboru Suzuki; Hisatomo Munetaka, both of Yokohama; Shoichi Kutsukake, Kawasaki, all of Japan

[73] Assignees: Nippon Telegraph & Telephone Public Corporation; Oki Electric Industry Co., Ltd.; Nippon Electric Co., Ltd.; Hitachi Limited; Fujitsu Limited

[22] Filed: Nov. 4, 1971

[21] Appl. No.: 195,719

[30] Foreign Application Priority Data

Nov. 6, 1970 Japan .............................. 45/97,141

[52] U.S. Cl. .................... 235/153 AC, 179/175.2 C
[51] Int. Cl. .......................................... H04m 3/28
[58] Field of Search ..................... 235/153, 153 AC, 235/153 AK, 153 A; 179/175.2 C, 175.3; 340/172.5, 146.1 E

[56] References Cited

UNITED STATES PATENTS

| | | | |
|---|---|---|---|
| 3,312,791 | 4/1967 | Markl et al. | 179/175.3 |
| 2,632,817 | 3/1953 | Kellser | 179/17512 M |
| 3,344,241 | 9/1967 | Harmon et al. | 179/175.3 |
| 3,378,650 | 4/1968 | Goeller, Jr. | 179/175.2 M |
| 3,633,016 | 1/1972 | Walker et al. | 235/153 |
| 3,657,527 | 4/1972 | Kassabgi | 235/153 |
| 3,662,125 | 5/1972 | Haas, Jr. | 179/175.3 |

OTHER PUBLICATIONS

R. W. Downing et al., No. 1 ESS Maintenance Plan, The Bell System Technical Journal, September 1964, pp. 1961–2019.

*Primary Examiner*—Charles E. Atkinson
*Attorney*—Richard C. Sughrue et al., Darryl Mexic, Peter D. Olexy, Robert V. Sloan, J. Frank Osha and Robert J. Seas, Jr.

[57] ABSTRACT

Emergency supervising equipment for supervising the overall operation of the processing program operation of a stored program controlled switching system. The equipment periodically applies a simulated starting signal to an incoming trunk circuit of the switching system. The emergency supervising equipment comprises means for detecting a responsive reversal signal sent back from the incoming trunk circuit when the trunk circuit is connected to an incoming register trunk circuit. The equipment determines that a normal condition prevails when the reversal signal is received within a certain period and it determines that an emergency condition exists when the reversal signal is not received within a certain predetermined period. The equipment may be so constructed as to determine the emergency condition only after detecting a certain predetermined number of successive faulty conditions or it may be so constructed to determine the emergency condition only when a predetermined number of simultaneous faulty conditions are detected using a plurality of the supervising equipments.

9 Claims, 3 Drawing Figures

EMERGENCY SUPERVISING EQUIPMENT

BACKGROUND OF THE INVENTION

1. Field of the Invention

The present invention relates to emergency supervising equipment for supervising an emergency condition of controlling devices of a common controlled switching system, or more particularly to that of a stored program controlled electronic telephone switching system from periphery of the system.

2. Description of the Prior Art

Generally speaking, a common controlled switching system can be sub-divided into two systems. The first one is a speech path system comprised essentially of switches and the second one is a controlling system for controlling the switches in the speech path system.

Recent increase in demand requires high speed logic for the controlling system of such a common controlled switching system. In order to fulfill such requirements, the devices in the controlling system are mainly made of electronic elements such as transistors, diodes, etc. However, in view of economy, the switch devices in the speech path system are usually made of electromagnetic mechanical devices, such as a cross-bar switch, ferreed switch, etc. Also, a stored program controlled electronic switching system has been developed for obtaining very wide system flexibility. In such a system, controlling instructions are stored as programs in the memory devices.

In such a stored program controlled electronic switching system, a predetermined switching operation is carried out by the closely related operation of the speech path equipment, i.e., switches, usually called hardware and that of the program controlling operation in the controlling system which is usually referred as a software. Accordingly should a fault occur either in the software or in the hardware, the program controlling process is no longer effected properly and the switching process may be interrupted.

There are various practices for detecting such an abnormal condition, which may be termed "emergency state."

When a fault occurs in the hardware part, a fuse alarm may be produced for instance, or an interruption processing may be carried out according to a predetermined program from the central controlling unit to check the response from the hardware by applying a starting instruction to it.

For detecting an abnormal condition of the software part, several detecting methods are known. For instance, in the so called path check method, a number of checking points are provided in the program to check whether the processing being properly carried out or not. An input-output check method is to check information at the input and at the output of a program. A timing supervising method is used to execute a test program in a certain predetermined· period and to check the program operation by the result of the text program. Also it is known to provide a warning function according to the program.

However, the known practices for detecting an emergency state of the software still have disadvantages in that a proper execution of an interruption operation is not assured when the controlling system, such as, the central control unit, becomes faulty, and if a program stepping function in the controlling system is lost, proper processing is not effected by any of the abovementioned checking processes. Furthermore, should such a failure occur a fault recovery program and also the facility of sending an alarm may also become inoperative. In such cases the call handling process is discontinued without indicating any alarm condition.

In the known switching system prior to such an electronic switching system, general faults in the system has been found by using the self-detecting facility of the switching system and as the case may be by a declared complaint from subscribers. However, in the recently developed electronic switching system, there is a possibility of the occurrence of an emergency status which cannot be identified by any of the known checking practices mainly the processing facility of the system is extremely centralized and the controlling program is effected also at a time when no actual call is applied to the system.

SUMMARY OF THE INVENTION

The present invention has for its object to mitigate the abovementioned disadvantages existing in such recently developed stored program controlled electronic switching system.

In accordance with the present invention, emergency supervising equipment operating independently of the main electronic switching system is connected to an incoming trunk of the switching system and the switching system is automatically started through the incoming trunk instead of a remote exchange at a predetermined interval to confirm that the controlling part of the switching system is operating normally even during times when no actual traffic is applied. If an abnormal condition, which is termed an emergency state, is found by the emergency supervising equipment, the equipment automatically sends out an alarm information to immediately alert the maintenance staff and as needed, the equipment starts an emergency circuit provided in the central control unit of the switching system to recover a proper processing operation of the system.

One aspect the invention provides emergency supervising equipment for a stored program controlled electronic switching system connected to an incoming trunk of the system, which comprises means for periodically producing a simulated seizure signal to an incoming trunk of the switching system, means for detecting a responsive information signal from the trunk when the incoming trunk is connected to one of the incoming register trunks of the switching system, means for judging the operation of the switching system as normal when the responsive information signal derived from the incoming trunk of the switching system is received within a certain period measured from the sending time of the seizure signal and which determines the system as faulty when said response information signal is not received within said certain predetermined period.

DESCRIPTION OF PREFERRED EMBODIMENT

In order to give a clear understanding of the present invention, the general operation and construction of a conventional stored program controlled switching system will be explained.

Figure 1:
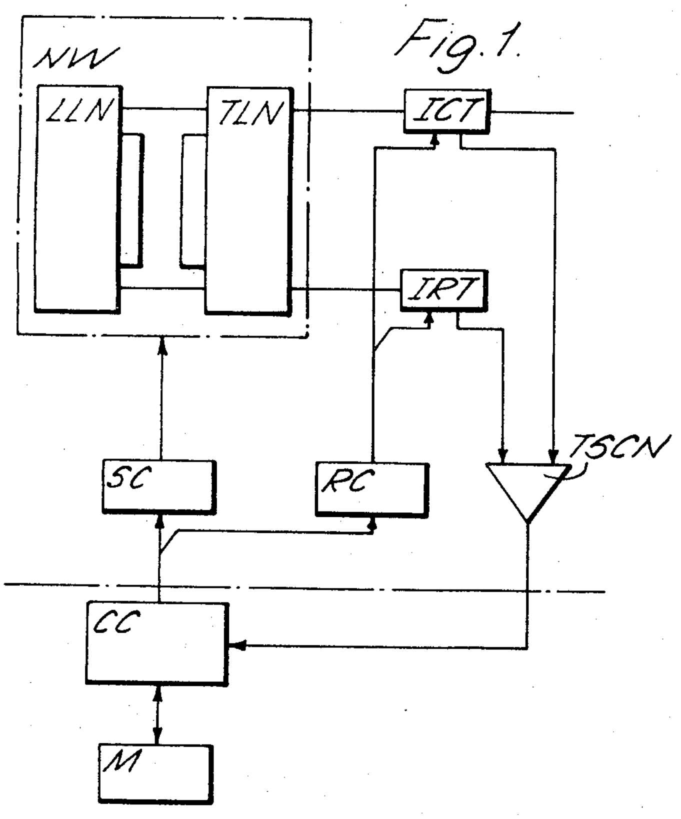
FIG. 1 is a block diagram showing one embodiment of a conventional stored program controlled electronic switching system.

FIG. 1 is a simplified block diagram showing the main portion of a stored program controlled electronic switching system. In the figure, a block denoted M is a memory device storing various programs defining the system operating sequence and the necessary data for the subscribers, speech paths, trunks, etc. The block denoted as CC is a central control unit for controlling the overall processing of the switching system and controls speech path devices in accordance with a predetermined program. The memory device M and the central control unit CC are the main portions of the controlling part of the switching system. These two devices are shown below a chain dotted line. The block at the right top corner of the figure denoted ICT is an incoming trunk for receiving incoming calls from other exchange system. IRT is an incoming register trunk for receiving the signal of the incoming call. NW generally depicts the speech path network comprising for instance a line link network LLN and a trunk link network TLN, etc., SC is a switch controller for controlling said speech path network, RC is a relay controller for controlling relays in the various trunks such as the incoming trunk ICT, etc., and TSCN is a trunk scanner for identifying the status of the trunks. The speech path portion of the switching system consists mainly of the abovementioned speech path network NW, various trunks ICT, IRT, various controllers SC, RC and trunk scanner TSCN, etc. It is to be noted that the quantity of equipment needed depends on the traffic requirement although only one set of devices is shown.

Operation of the stored program controlled electronic switching system will be explained by explaining the manner in which an incoming trunk connection is made. If an inter office trunk is selected from other exchanges, an incoming trunk ICT corresponds to the corresponding outgoing trunk of the remote exchange is seized.

Figure 2:
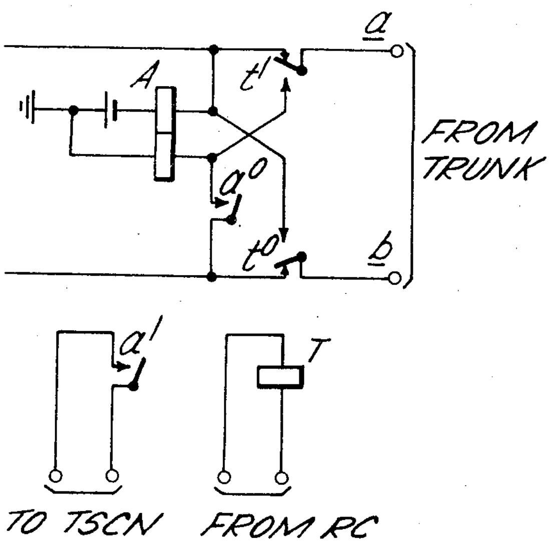
FIG. 2 is a circuit diagram showing an essential part of an incoming trunk circuit of the switching system.

FIG. 2 is a simplified circuit diagram showing an essential part of the circuit of the incoming trunk ICT. When a trunk is seized from a remote exchange a ground potential is connected to the terminal *a* of the incoming trunk ICT. When the ground potential is connected to terminal *a*, a current flows through one of the coils of a relay A thus the relay A is energized. By operation of the relay A, a ground potential through another coil of the relay A is returned to the other exchange through contact $a^0$ and the terminal *b*. Operation of the relay A also causes closure of its contact $a^1$, which indicates to trunk scanner TSCN the existence of an incoming call to trunk scanner TSCN. This information concerning the incoming call is detected by the central control unit CC through its incoming trunk scanning program executed within a certain period. The central control unit CC operates on the information according to a predetermined internal processing program and selects an idle incoming register trunk, and takes channel matching between the incoming trunk ICT which had received the incoming call and said incoming register trunk IRT. The unit CC sends out, according to a predetermined output program, the necessary information for relay driving. The switch controller SC and the relay controller RC set a speech path between the incoming trunk ICT and an idle incoming register trunk IRT according to said information and also energize relay T in the incoming trunk ICT. In the incoming trunk ICT, the contacts $t^0$ and $t^1$ are switched by the operation of the relay T. In this condition, the terminal *a* receives ground potential and the terminal *b* receives negative battery potential. This reversal of the polarity is a response information for the remote exchange indicating the completion of the connection to an incoming register trunk IRT. The equipment in the remote exchange will respond to the response information and send further information such as a dial signal to the incoming register IRT via the incoming trunk ICT.

As explained above, the central control unit CC and the memory M constitute the most important part of the controlling system of the switching system and effect the controlling operation according to the operational program, which is the software of the system. In other words, this kind of stored program controlled switching system functions through a very close cooperation between the software portion, i.e., the programs and the hardware portion, i.e., the devices. In such a system, should a fault occur either in the software or in the hardware, the switching program may not be carried out properly and the operation process is discontinued.

More particularly, if the central control unit becomes faulty, not only is proper execution of the program is lost, but where its program stepping facility is lost, an interruption program, fault recovery program or trouble indicating program may also be lost. Should this occur, the calling process may be completely discontinued without indicating any alarm notice.

As explained in the foregoing, the present invention is to provide emergency supervising equipment, operating independently from the switching system which carries out the supervising function by applying to the switching system a simulated trunk call condition from the periphery of the system by connecting the equipment to an incoming trunk of the system to check the normal operation of the same. The equipment can send out an alarm to the attendants to report the necessity of immediate manual treatment, or according to the need it energizes an emergency condition restoring circuit in the switching system so that the switching system may be placed back into operation.

Figure 3:
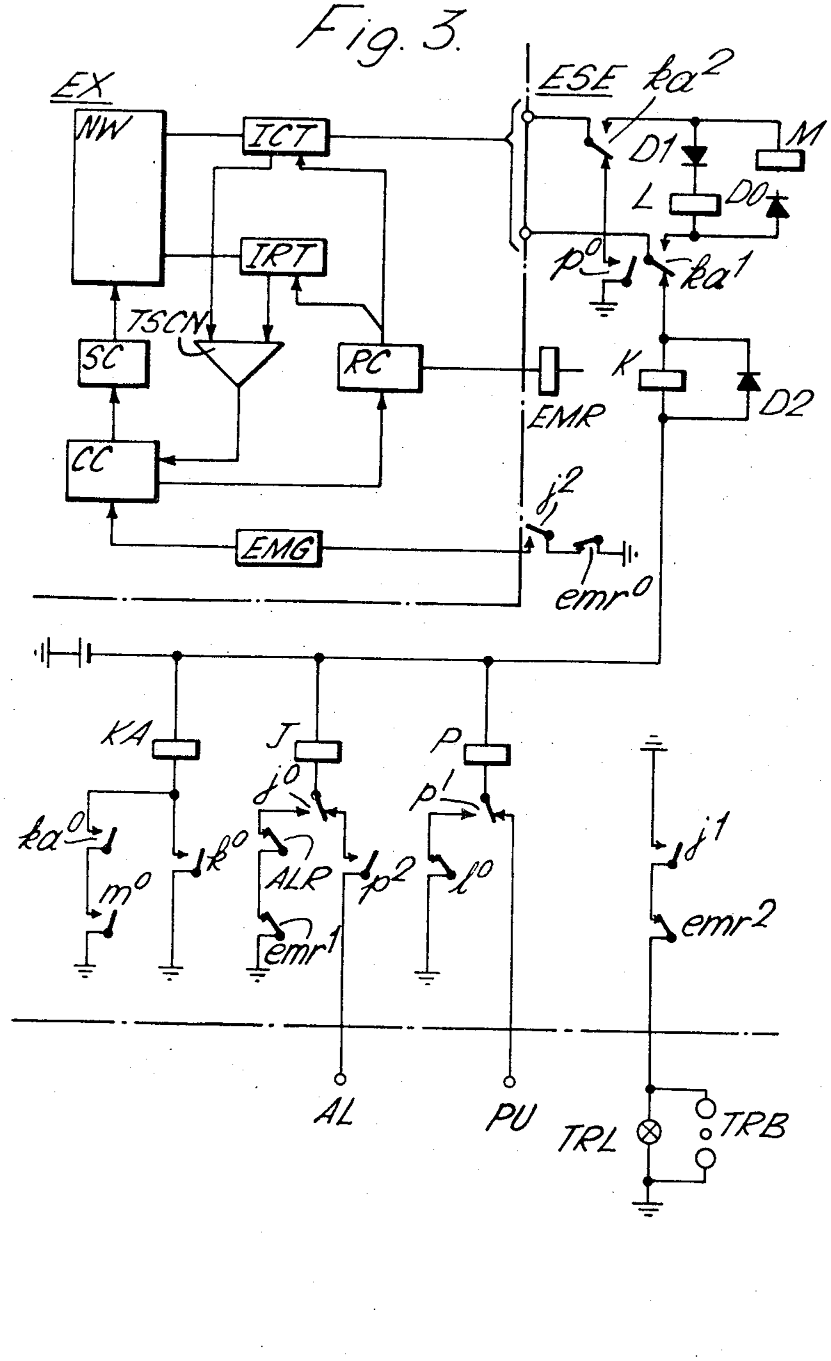
FIG. 3 is a circuit diagram partially shown in block form of emergency supervising equipment according to the present invention.

The emergency supervising equipment according to the present invention will be explained by referring to FIG. 3 illustrating an embodiment of the invention.

FIG. 3 depicts a circuit diagram of an embodiment of the emergency supervising equipment. In FIG. 3, *EX* generally depicts a switching system to be supervised. This switching system is known per se and may correspond to the system shown in FIG. 1. Only those portions necessary for an understanding of the present invention are illustrated. In the switching system *EX*, the block denoted as NW is the speech path network consisting of switches, ICT the incoming trunk, IRT incoming register trunk, SC the switch controller, RC the relay controller, TSCN the trunk scanner, CC the central control unit, and EMG is an emergency condition recovering circuit. The general operation of the switching system *EX* has been previously described with reference to FIG. 1 so that it need not be repeated. *ESE* generally depicts the emergency supervising equipment which consists mainly of a plurality of relays. In this emergency supervising equipment *ESE*, the relay denoted as EMR is an emergency condition resetting relay which operates when the system is restored to its normal condition as a consequence of an emergency operation. P and J are relays for obtaining timing of the emergency detection. K is a relay for detecting the response of an incoming trunk ICT. KA is an auxiliary relay of the detection relay K. $D_1$, $D_2$ and $D_3$ are diodes. L and M are relays for supervising the dc loop formed between the incoming trunk ICT. TRL is a lamp for indicating an emergency condition, TRB is a dc bell for sending an audible alarm and ALR is a key-switch for resetting the alarm bell TRB. PU is a starting signal for the supervising equipment *ESE* and AL is an alarm signal arriving within a certain delay time from the starting signal PU. Both signals PU and AL may be supplied from the switching system, for instance the timing signals of one polarity for preventing permanent lamp condition or for erasing charging pulses. These signals are produced independently from the program of the switching system.

The operation of the abovementioned emergency supervising equipment *ESE* will be explained hereinafter. When the starting signal PU is applied to the emergency supervising equipment *ESE* connected to an idle incoming trunk ICT, the relay P operates in response to the starting signal PU. The relay P holds itself by the self-holding circuit including its contact $p^1$ and a normally closed contact $l^0$. By the operation of the relay P, ground potential is connected through the contact $p^0$ and a back contact $ka^2$ to a terminal *a* of the incoming trunk ICT. As explained above, the incoming trunk ICT having its circuit as shown in FIG. 2 is now receives a starting signal. In the incoming trunk ICT, the relay A operates upon its seizure through the terminal *a* just the same as an ordinary incoming call by its wired logic. By the operation of relay A in the trunk ICT, the contact $a^0$ closes and ground potential through one coil of the relay A is sent to the emergency supervising equipment *ESE* through the terminal *b*. In the equipment *ESE* relay K operates by the ground potential information and the auxiliary relay KA also operates. By the energization of the relay KA, the contacts $ka^1$ and $ka^2$ are switched over and a dc loop circuit is established between the equipment *ESE* and the incoming trunk ICT. Against this dc loop circuit, negative battery voltage is connected to the terminal *a* and ground potential is applied to the terminal *b*, so that loop current flows from the terminal *b* to relay M through a circuit starting from terminal *b*-contact $ka^1$-diode $D_0$-winding of relay M-contact $ka^2$-terminal *a*. The relay M operates by a current flowing through this loop circuit. By the operation of the contact $ka^1$, the holding circuit of the relay K is disconnected. However, as the winding of relay K is connected in parallel with a diode $D_2$ the relay K is provided with a slow release function and holds its operating condition for a little time and then releases to its normal position as illustrated in FIG. 3. The relay K by its slow release function assures the operation of its auxiliary relay KA until the relay KA holds itself through its contact $ka^0$ and a contact $m^0$ of the relay M.

On the other hand in the switching system, the seizure of the incoming trunk ICT is indicated by a contact $a^1$ of the relay A to the trunk scanner TSCN. This incoming call information is detected by the central control unit CC by its periodically executed incoming trunk scanning program just the same as an ordinary incoming call. The central control unit CC will react against this incoming call information just the same as an ordinary incoming call according to its internal processing program sequence and connect the incoming trunk ICT to an idle incoming register trunk IRT and then energizes relay T of the incoming trunk ICT. Upon operation of the relay T of the incoming trunk ICT, the dc polarity between the terminals *a* and *b* is reversed so that the terminal *a* assumes ground potential and the terminal *b* assumes negative battery potential. By reversal of the polarity from the incoming trunk ICT to the aforementioned loop circuit in the equipment *ESE*, the relay M releases and a relay L operates by the function of diodes $D_0$ and $D_1$. Namely, the relay L operates through a circuit starting from terminal *a*-contact $ka^2$-diode $D_1$-winding of relay L-contact $ka^1$-terminal *b*. The energizing current to relay M is blocked by the diode $D_0$ and releases to normal position. As a result, the normally closed contact $l^0$ is opened, to interrupt the holding circuit of the relay P and an operating contact $m^0$ is also opened. Accordingly the relay P releases by the opening of the contact $l^0$. The relay KA is deenergized by the opening of the contact $m^0$ and it releases. The relay L is now disconnected from its operating loop circuit by the releasing of relay KA and opening of its contacts $ka^1$ and $ka^2$. The emergency supervising equipment *ESE* now returns to its normal condition. So far as the switching system is operating normally to respond to an incoming trunk call to the incoming trunk ICT by operating relay T of the trunk ICT to send out a reverse polarity indication to the equipment *ESE*, the emergency supervising equipment *ESE* returns to its normal condition after the completion of the supervising operation as set forth above and await next starting signal PU. Upon arrival of the next starting signal PU, the relay P operates again and the same operational sequence is repeated.

The alarm signal AL is a signal arriving with a certain delay time from the arrival time of each of the starting signal PU. Should the reverse polarity response indication not be received from the incoming trunk ICT by reason of some possible fault in the switching system *EX* before the certain predetermined delay time of the signal AL, i.e., if the relay L is not operated during a certain period, the alarm signal AL arrives while the relay P is in operating condition. The relay J operates by this alarm signal AL via the contact $p^2$ and the contact $j^0$ and it holds itself by the contact $j^0$ via a self-holding circuit including the switch ALR and a contact $emr^1$. The emergency supervising equipment *ESE* will indicate an emergency condition to the attendants by brightening the lamp TRL via a contact $j^1$ and operating the dc bell TRB by the operation of the relay J. As needed, an information signal is sent to an emergency recovering circuit EMG of the switching system through a contact $j^2$ and a contact $emr^0$ and energizes the emergency recovering circuit EMG to start the emergency program operation to restore the faulty condition of the switching system *EX*.

The emergency recovering circuit EMG is a circuit operating independently from the controlling system of the switching system and to operate an initial setting of the controlling system. The emergency recovering circuit EMG is started when the controlling operation of the switching system is lost by reason of a fault and operates to switch over the system in the hardware according to a fixed pattern without asking any help of the duplicated memory devices M or the central control units CC for restoring the proper operation of the switching system, and the result of the switching is checked by the controlling system according to the software of the system. The emergency recovering circuit EMG may also be provided in the central control unit of the switching system.

The time interval between the arrival of the starting signal PU and that of the alarm signal AL is to be selected longer than that of the time required for an ordinary incoming call connection, i.e., the time between the time of seizure of an incoming trunk ICT by the closure of the contact $p^0$ and the time of detection of the reverse polarity response signal by the operation of the relay L in the emergency supervising circuit *ESE* and is to be shorter than tolerable service discontinuation time for the switching system in view of its service standard.

Releasing from an emergency detecting condition of the emergency supervising equipment *ESE*, i.e., the release of the self holding relay J may be effected by operation of the key-switch ALR by the attendant after discovering the cause of the faulty switching system manually, or by the opening of a brake contact $emr^1$ of the emergency condition resetting relay EMR which operates by a confirming signal of the restoration of the switching system *EX* to its normal condition by the function of the emergency recovering circuit EMG.

The above explained emergency supervising equipment *ESE* according to the present invention may not receive the predetermined response indication reverse signal from the switching system even it had applied the simulated incoming call to the trunk ICT when the system is not operating properly for instance due to a fault in the call processing program, i.e., the incoming trunk call detection program, internal processing program, etc. If the alarm signal AL arrives at the equipment *ESE* in this case, the relay J operates and necessary operations such as sending an alarm or starting the emergency recovering circuit EMG, etc. are carried out. However, also in such an instance where all of the incoming trunks ICT are busy or in the case of link-block, etc., there is a possibility that no response indication signal is derived from the incoming trunk ICT to the relay L after applying the simulated incoming trunk call of the equipment *ESE* to the switching system *EX*. In this case, by the alarm signal AL, the relay J operates and as a consequence, an alarm to the maintenance staff may unnecessarily be sent out or the emergency recovering circuit EMG may be started to execute the fault recovering operation in the switching system *EX* even if the system *EX* is operating properly.

The emergency supervising equipment *ESE* according to the present invention further provides several solutions to solve the above situation, which will be explained hereinafter.

The first solution is to reconnect the emergency supervising equipment *ESE* to another incoming trunk terminal of the switching system *EX* after the first detection of an emergency state. In other words, not sending an alarm by a mere detection of a faulty condition at the first occasion of the detection and not to start the trouble recovering operation, but to make reconnection of the equipment *ESE* to other incoming trunk terminal and to restart the emergency detecting operation in the same manner as mentioned above. When an emergency is also detected at the second incoming trunk terminal of the system *EX* the equipment *ESE* is again reconnected to a further different incoming trunk terminal and to function the supervising operation successively. When such faulty conditions are detected successively over a predetermined number of the supervising equipment *ESE* it judges that an emergency state might have occurred in the switching system *EX*. In this case, it is required to provide a memory element in the equipment *EXE* to memorize the number of continuous detections of such irregular operations of the system *EX*. Such a memory element may be a very simple counter circuit stepped once each time by the operation of the relay J and to be reset by the operation of the relay L. The emergency state is started when the count of the counter circuit reaches a predetermined number.

The second solution is to provide a system in which a plurality of such emergency supervising equipment *ESE* are used. Namely, a plurality of such equipment *ESE* are connected to respective terminals of a plurality of incoming trunks ICT of the system *EX* and each equipment *ESE* may operate the fault detection function independently by applying the simulated incoming calls to the respective trunks of the switching system *EX* from respective supervising equipment *ESE*. The results of detection of the plurality of the emergency supervising equipment may be processed via a threshold logic circuit such as for instance majority logic circuit and in case more than a certain predetermined number of the plurality of equipments *ESE* detect an abnormal condition of the system *EX*, the emergency state of the switching system *EX* is determined and the alarm and the necessary trouble recovery operation are commenced.

As explained above according to the present invention emergency supervising equipment may be realized which will provide a supervising function from the periphery of the switching system *EX* independently both to the software part and hardware part of the switching system and by which the switching system is started with a predetermined period to detect an abnormal condition of the overall program controlling of the system including part of the incoming trunk call process of the system so that any fault in the hardware portion or the software portion including the central controlling units may be detected and any fault or delay of the program processing of the switching system which may result in discontinuation of the service of the switching system can be determined.

In practice the period of applying the simulated call may be selected in an order of 3 minutes in view of keeping the service standard but the invention is not restricted to a certain value.

What is claimed is:

1. Emergency supervising equipment for supervising the normal operating condition of a stored program common controlled electronic switching system comprising, means for periodically applying a simulated calling condition signal to an incoming trunk of the switching system, means for detecting a response indicating reverse signal derived from the incoming trunk of the switching system when it is connected to an incoming register of the switching system, and means responsive to said detecting means for judging the operation of the switching system as normal when the response indicating reverse signal derived from the incoming trunk of the switching system is received within a certain period after seizure of the trunk and for judging the system as faulty when said response indicating reverse signal is not received within said certain predetermined period, said means for judging operating autonomously and existing in said switching system independently from the central control equipment of the switching system.

2. Emergency supervising equipment as claimed in claim 1, further comprising means for reconnecting the supervising equipment to other incoming trunks when a faulty condition of the switching system is detected, and means for determining that the switching system is in an emergency state when a successive predetermined number of said faulty conditions are detected.

3. Emergency supervising system comprising a plurality of said emergency supervising equipment as claimed in claim 1, wherein the plurality of said emergency supervising equipment are connected to different incoming trunk terminals of the switching system, wherein an emergency condition of the switching system is determined when more than a predetermined number of the plurality of equipment identify faulty condition of the switching system in parallel.

4. Emergency supervising equipment as claimed in claim 1, further comprising an emergency recovering circuit and means responsive to said judging means when a faulty system is determined for starting said emergency recovering circuit provided in a controlling system of the switching system.

5. Emergency supervising equipment as claimed in claim 2, further comprising an emergency recovering circuit and means responsive to said judging means when a faulty system is determined for starting said emergency recovering circuit provided in a controlling system of the switching system.

6. Emergency supervising system as claimed in claim 3, further comprising an emergency recovering circuit and means responsive to said judging circuit when a faulty system is determined for starting said emergency recovering circuit provided in a controlling system of the switching system.

7. Emergency supervising equipment for supervising the operating condition of a stored program common controlled electronic switching system comprising, means for applying a simulated incoming call signal to an incoming trunk of said switching system, means for detecting a response indicating signal from said incoming trunk, means from applying an alarm signal to said emergency supervising equipment a predetermined time after the application of said simulated incoming call signal to said incoming trunk, means responsive to the reception of the alarm signal by the emergency supervising equipment prior to detection of said response indicating signal for triggering a fault indicator.

8. The emergency supervising equipment of claim 7, wherein said simulated incoming call signal applying means comprises a first relay means (P) for connecting said incoming trunk to a d.c. reference potential, at a first polarity, said detecting means comprises a parallel circuit including a first diode serially connected to a second relay means (M) in parallel with a second diode serially connected to a third relay means (L), said second relay means (M) being de-energized and said third relay means (L) being energized in response to said response indicating signal, said third relay means (L) including means ($l_0$) for de-energizing said first relay means (P) in response to energization of said third relay means, said means for triggering comprising a fourth relay means (J) energized in response to said alarm signal arriving prior to the de-energization of said first relay means (P).

9. The emergency supervising equipment of claim 8, further including emergency condition resetting means, responsive to the energization of said fourth relay means (J), for causing the switching system to switch to a state restoring proper operation of the switching system.

* * * * *